(12) United States Patent
Nanda et al.

(10) Patent No.: US 9,239,605 B1
(45) Date of Patent: Jan. 19, 2016

(54) COMPUTING DEVICE POWER STATE TRANSITIONS

(75) Inventors: Sameer Nanda, San Jose, CA (US); Ryan Cairns, Los Altos, CA (US); Ryan Tabone, San Francisco, CA (US)

(73) Assignee: Google Inc., Mountain View, CA (US)

( * ) Notice: Subject to any disclaimer, the term of this patent is extended or adjusted under 35 U.S.C. 154(b) by 642 days.

(21) Appl. No.: 13/079,526

(22) Filed: Apr. 4, 2011

(51) Int. Cl.
*G06F 1/32* (2006.01)

(52) U.S. Cl.
CPC .................. *G06F 1/3203* (2013.01)

(58) Field of Classification Search
CPC .................. G06F 1/32; G06F 1/3203
USPC ......................................... 713/323
See application file for complete search history.

(56) References Cited

U.S. PATENT DOCUMENTS

| | | | |
|---|---|---|---|
| 4,965,738 A * | 10/1990 | Bauer et al. | 320/136 |
| 7,085,595 B2 * | 8/2006 | Kitchin | 455/574 |
| 7,296,171 B2 * | 11/2007 | Hahn et al. | 713/324 |
| 8,222,990 B2 * | 7/2012 | Gerner et al. | 340/5.2 |
| 2004/0070371 A1 * | 4/2004 | Chern et al. | 320/136 |
| 2009/0150660 A1 * | 6/2009 | Yao et al. | 713/2 |
| 2010/0153765 A1 * | 6/2010 | Stemen et al. | 713/340 |
| 2010/0169683 A1 * | 7/2010 | Wang et al. | 713/323 |

OTHER PUBLICATIONS

"Hibernation (computing)", Wikipedia, the free encyclopedia, Feb. 26, 2011, 4 pages.
"Sleep Mode", Wikipedia, the free encyclopedia, Feb. 22, 2011, 2 pages.

* cited by examiner

*Primary Examiner* — Kim Huynh
*Assistant Examiner* — Eric Chang
(74) *Attorney, Agent, or Firm* — Brake Huges Bellermann LLP (57) ABSTRACT

Methods and apparatus for scheduling and controlling power management activities are disclosed. An example method includes automatically scheduling a wake-up alarm for a computing device and transitioning the computing device from an active power state to a first low power state. The example method also includes, in response to occurrence of the automatically scheduled wake-up alarm, transitioning the computing device from the first low power state to the active power state and transitioning the computing device from the active power state to a second low power state, where the second low power state is a lower power state than the first low power state.

12 Claims, 5 Drawing Sheets

COMPUTING DEVICE POWER STATE TRANSITIONS

TECHNICAL FIELD

This application relates, in general, to power state transitions in a computing device.

BACKGROUND

Computing devices, such as laptop computers, netbook computers, or other such devices, often implement power management techniques in order to reduce the amount of power consumed by those devices over time, for instance, during periods of user inactivity. In some approaches, such techniques may be used only when the device is operating on battery power, or, in other approaches, may be used regardless of the power source being used (e.g., battery or AC power).

In current power management techniques, an operating system (OS) of a computing device may use timer and/or threshold values as triggers for performing power management activities. For example, an OS may use default or user selected timer values to measure periods of inactivity, after which, the OS may perform one or more power management activities In other situations, an OS may use threshold values, such as battery level thresholds, as triggers for performing power management activities. However, because such approaches require action by an OS to implement such power management activities, power management activities cannot be performed when the computing system is in a non-OS aware state, such as a low power (e.g., suspend) state.

SUMMARY

In a general aspect, a computer-implemented method includes automatically scheduling a wake-up alarm for a computing device; transitioning the computing device from an active power state to a first low power state; and, in response to occurrence of the automatically scheduled wake-up alarm: transitioning the computing device from the first low power state to the active power state and transitioning the computing device from the active power state to a second low power state, where the second low power state is a lower power state than the first low power state.

Implementations may include one or more of the following features. For example, the automatically scheduled wake-up alarm may be based on a current time equaling a predetermined time. The automatically scheduled wake-up alarm may be based on a battery charge capacity falling below a predetermined threshold battery charge capacity. Automatically scheduling the wake-up alarm may include automatically scheduling the wake-up alarm based on one or more operating statistics of the computing device.

The active power state may be an AC power operating state. The active power state may be a battery power operating state. The first low power state may be a suspend-to-random-access-memory (RAM) state and the second low power state may be one of a suspend-to-disk state and a power-off state. The first low power state may be a suspend-to-disk state and the second low power state may be a power-off state.

Transitioning from the first low power state to the active power state may include implementing a resume-from-suspend process. Transitioning from the active power state to the second low power state may include saving, to non-volatile memory of the computing device, a subset of operating state information of the computing device saved to volatile memory of computing device during the transition from the active power state to the first low power state. Transitioning from the active power state to the first low power state may include saving, to random-access-memory (RAM), operating state information of the computing device.

In another general aspect, a computer-implemented method includes automatically scheduling a wake-up alarm for a computing device; initiating a transition of the computing device from an active power state to a first low power state; in response to a wake up event, transitioning the computing device from the first low power state to the active power state; determining whether the wake up event is the automatically scheduled wake-up alarm or a user-initiated action; if the wake up event is the automatically scheduled wake-up alarm, initiating a transition from the active power state to a second low power state, where the second low power state is a lower power state than the first low power state; and if the wake up event is the user-initiated action: remaining in the active power state and cancelling the automatically scheduled wake-up alarm.

Implementations may include one or more of the following features. For example, the user-initiated action may include a signal indicating activity of a user-input device of the computing device. The user-input device may include one of a keyboard and a pointing device. The user-initiated action may include a signal indicating engagement of a power switch of the computing device. The user-initiated action may include a signal indicating opening of a display of the computing device.

The automatically scheduled wake-up alarm may be based on a current time equaling a predetermined time. The automatically scheduled wake-up alarm may be based on a battery charge capacity falling below a predetermined threshold battery charge capacity. The wake-up alarm may be scheduled based on a battery reading for a battery of the computing device. The wake-up alarm may be scheduled based on a frequency of user interaction with the computing device.

In another general aspect, a computer-implemented method includes automatically scheduling a wake-up alarm for a computing device; transitioning the computing device from a first active power state to a first low power state; and, in response to occurrence of the automatically scheduled wakeup alarm: transitioning the computing device from the first low power state to a second active power state; and transitioning the computing device from the second active power state to a second low power state, where the second low power state is a lower power state than the first low power state.

Implementations may include one or more of the following features. For example, the first active power state may be an AC power operating state and the second active power state may be a battery power operating state. The first active power state may be a display-active operating state and the second active power state may be a display-inactive operating state. The display-active operating state and the display-inactive operating state may each be one of a battery power operating state and an AC power operating state.

In another general aspect, a recordable storage medium has recorded and stored thereon instructions that, when executed, cause a computing device to automatically schedule a wake-up alarm for the computing device; transition the computing device from an active power state to a first low power state; and, in response to occurrence of the automatically scheduled wake-up alarm: transition the computing device from the first low power state to the active power state; and transition the computing device from the active power state to a second low power state, where the second low power state is a lower power state than the first low power state.

In another general aspect, a recordable storage medium has recorded and stored thereon instructions that, when executed, cause a computing device to automatically schedule a wake-up alarm for the computing device; initiate a transition of the computing device from an active power state to a first low power state; in response to a wake up event, transition the computing device from the first low power state to the active power state; determine whether the wake up event is the automatically scheduled wake-up alarm or a user initiated action; if the wake up event is the automatically scheduled wake-up alarm, initiate a transition from the active power state to a second low power state, where the second low power state is a lower power state than the first low power state; and, if the wake up event is the user initiated action: remain in the active power state and cancel the automatically scheduled wake-up alarm.

In another general aspect, a recordable storage medium has recorded and stored thereon instructions that, when executed, cause a computing device to automatically schedule a wake-up alarm for the computing device; transition the computing device from a first active power state to a first low power state; and, in response to occurrence of the automatically scheduled wakeup alarm: transition the computing device from the first low power state to a second active power state and transition the computing device from the second active power state to a second low power state, where the second low power state is a lower power state than the first low power state.

In another general aspect, a computer-implemented method includes automatically scheduling a wake-up alarm for a computing device; transitioning the computing device from an active power state to a first low power state; and, in response to occurrence of the automatically scheduled wake-up alarm, transitioning the computing device from the first low power state to a second low power state, where the second low power state is a lower power state than the first low power state.

BRIEF DESCRIPTION OF THE DRAWINGS

Like reference symbols in the various drawings indicate like elements.

DETAILED DESCRIPTION

Figure 1:
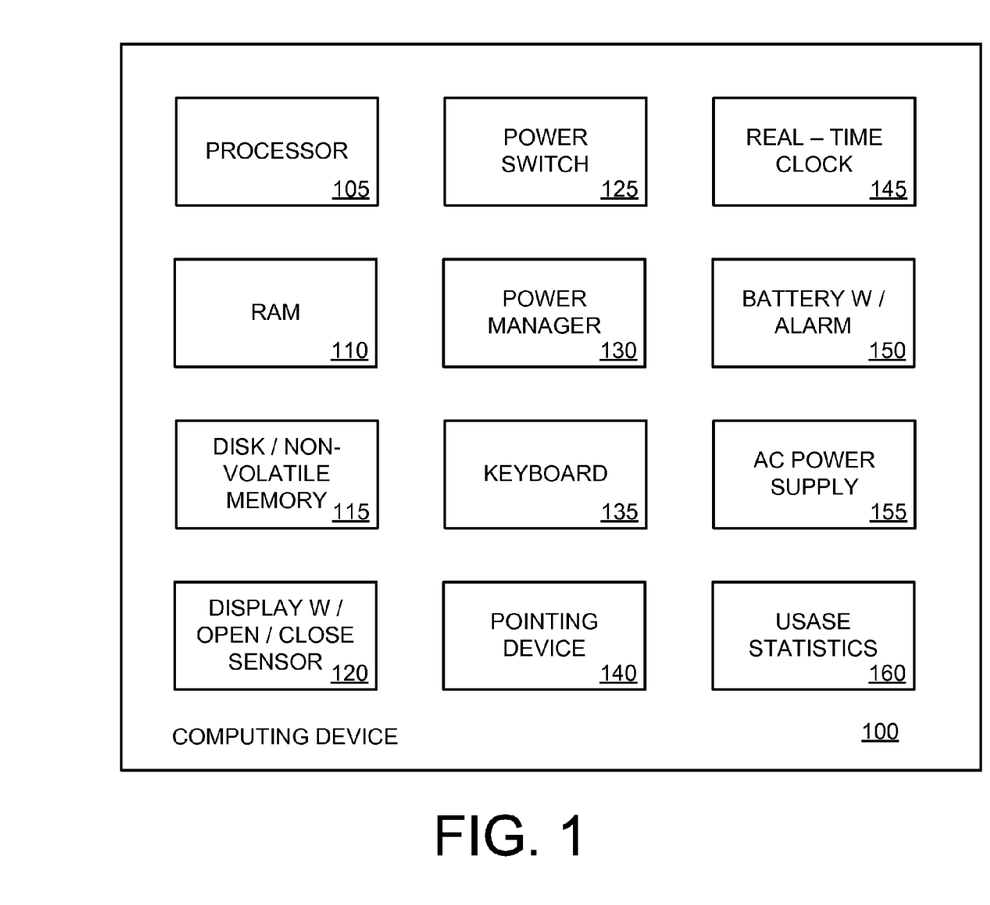
FIG. 1 is a block diagram illustrating a computing system in accordance with an example embodiment.

FIG. 1 is a block diagram illustrating a computing device 100 in accordance with an example embodiment. The computing device 100, as illustrated in FIG. 1, includes a number of modules, components and/or devices. It will be appreciated that the specific elements illustrated in FIG. 1 are shown for illustrative purposes and are given by way of example. In other embodiments, a computing device may include fewer elements, additional elements or may substitute certain elements of the computing device 100 with other elements.

Also, the various elements of the computing device 100 may be operationally coupled with one another in a number of appropriate manners. For instance, a processor 105 of the computing device 100 may be operationally coupled with one or more of the other elements of the computing device 100 using a bus, or multiple busses. As another example, a power manager module 130 of the computing device 100 may be coupled with the processor 105, a battery 150 and an AC power supply 155, as well as other appropriate elements of the computing device 100 for carrying out power management activities in the computing device 100.

As shown in FIG. 1, the computing device 100 includes the processor 105, random access memory 110, a disk/non-volatile memory 115, a display 120 with an open/closed sensor (e.g. a switch), a power switch 125, the power manager module 130, a keyboard 135, a pointing device 140 (e.g., a touch pad or a mouse), a real-time-clock 145, the battery 150 with a programmable battery alarm, the AC power supply 155 and a usage statistics module 160. In some embodiments, two or more of these elements may be combined into a single element. For example, the power manager 115 and the usage statistics module 160 can be implemented as a single module in the computing device 100. In other embodiments, a single element of the computing device 100 may be implemented as multiple elements, or may include multiple sub-elements. For instance, the battery 150 can be implemented using multiple elements, e.g., a battery and a separate battery alarm module. The particular arrangement of elements of a computing device will depend on the specific embodiment.

The computing device 100 shown in FIG. 1 may be configured to operate and/or implement a number of different power states. Such power states may include one or more active (operating) power states, a suspend-to-RAM power state (e.g., sleep state), a suspend-to-disk power state (e.g., hibernation state) and/or a powered-off power state, as some examples. The active power states may include a reduced-power active state, which may be used when the computing device 100 is operating using battery (DC) power (e.g., a battery-power operating state), in order to prolong battery life. The active power states may also include a full-power active state, which may be used when the computing device 100 is operating using alternating-current (AC) power (e.g., an AC-power operating state), such as from a wall outlet. In other embodiments, the computing device 100 may operate in a full-power active state regardless of whether the computing device 100 is operating using battery or AC power. In the reduced-power active state, the computing device 100 may operate at a reduced processing speed, operate at a reduced voltage and operate with brightness of a display device at a lower level as compared with a full-power active state for the computing device 100 in order to increase the time between battery charges.

Depending on the particular embodiment, implementing a reduced-power active state in the computing device 100 may include reducing operating current and/or operating voltage of one or more components of the computing device 100. For instance, one or more components of the computing device 100 may operate at a reduced clock speed in order to reduce respective amounts of current used by those components. In such approaches, other components of the computing device 100 may operate at both a reduced voltage and a reduced speed, which will further decrease the amount of power consumed by those components as compared to simply reducing the operating speed, for example. In some embodiments, implementing a reduced-power active state may include powering off one or more circuits and/or components of the computing device 100.

In a full-power active state, the computing device 100 may operate at a higher processing speed, operate at a higher voltage and operate with a higher display device brightness level, which may boost the performance of the computing device 100 relative to its performance when operating in the reduced-power active state, and which may be used when the computing device is operating using alternating-current (AC) power, such as using an AC-to-DC converter that is plugged into a wall outlet. In some embodiments, the specific parameters of each power state, active or otherwise, may be selected by a user (e.g., such as by using features of an operating system of the computing device 100 and/or the power manager 130).

The computing device 100 may be configured to implement the power management techniques described herein in order to reduce an amount of power consumed by the computing device 100 over time, such as during periods of user inactivity. Further, the computing device 100 may be configured to implement the techniques described herein to prevent the loss of operating state information for the computing device 100, in order to prevent startup (boot) issues that may occur if such operating state information is not persistently saved prior to complete loss of charge in the battery 150.

In the computing device 100, the processor 105 may execute instructions that are stored in RAM 110, on the disk/non-volatile memory (disk) 115, or in the power management module 130 to implement such power management activities. As described herein, the computing device 100 may be configured to trigger performance of power management activities even when the computing device 100 is in a non-OS aware state.

For instance, the computing device 100 may be configured to automatically schedule one or more events and to perform power management activities in response to occurrence of the automatically scheduled event(s), where the automatically scheduled event(s) occur when the computing device 100 is in a non-OS aware (e.g., low power/suspend) state. As one example, the computing device 100 may automatically schedule an alarm using a real-time clock (RTC) 145. After scheduling the RTC alarm, the computing device 100 may be configured to transition from a first active (operating) state to a first low-power state, such as a suspend-to-RAM (sleep) state. Upon occurrence of the RTC alarm, the computing device 100 may be configured to transition from the first low-power state to a second active (operating) state (which may be the same as the first operating state, or may be a different operating state) and then transition to a second, even lower power (e.g., suspend) state, such as a suspend-to-disk (hibernate) state or a powered-off state. Such an approach may reduce an amount of power consumption of the computing device 100 over a given time period, such as during a period of user inactivity. In such an approach, the first active power state may be a display-active power state, where a display of the computing device is powered on and active and the second active power state may be a display-inactive power state, where the display is powered off, which may further reduce power consumption. In other embodiments, the display of the computing device 100 may be active or inactive in both the first active power state and the second active power state.

As another example, the computing device 100 may automatically schedule a battery alarm for the battery 150. For instance, a battery alarm may be scheduled to occur when the charge capacity of the battery 150 drops below a threshold capacity. In such an approach, after scheduling the battery alarm, in like fashion as discussed above with respect to the RTC alarm, the computing device 100 may be configured to transition from a first active (operating) state to a first low-power state, such as a suspend-to-RAM (sleep) state. Upon occurrence of the battery alarm, the computing device 100 may be configured to transition from the first low-power state to a second operating state (which may be the same as the first operating state, or may be a different operating state) and then transition to a second, even lower power (e.g., suspend) state, such as a suspend-to-disk (hibernate) state or a powered-off state.

Such an approach may reduce an amount of power consumption of the computing device 100 over a given time period, such as during a period of user inactivity. Further, such an approach may be used to prevent loss of operating state information for the computing device 100. Using such an approach, a battery alarm could be set to occur when a charge of the battery 150 drops below a relatively low capacity threshold (e.g., five percent or less of a total charge capacity of the battery). When the battery alarm occurs, the computing device 100 can persistently save (e.g., to the disk 115) operating state information for the computing device 100 that was previously stored in RAM 110 when the device 100 transitioned to the second low-power state (e.g., hibernate or power off). This approach can provide for graceful shutdown of the computing device 100 and, thus, can prevent negative startup issues for the computing device 100 due to loss of operating state information saved to RAM 110 in the event the battery 150 were to become entirely depleted while the computing device 100 is in a suspend-to-RAM state.

In some embodiments, the computing device 100 may automatically schedule alarms based on default parameters. For instance, RTC alarms may be set using a fixed time period and battery alarms may be set using a fixed threshold value. As an example of such an approach, the computing device 100 may be configured to set an RTC alarm to occur a fixed time period of sixty minutes (or another fixed time period) after entering a suspend-to-RAM state. In this example, the computing device 100, in response to the RTC alarm, in like fashion as discussed above, may transition from a suspend-to-RAM to an active state and then transition to a lower power state, such as a suspend-to-disk state or a power-off state.

In another example, the computing device 100 may be configured to automatically schedule a battery alarm to occur at a fixed battery capacity of seventy-five percent (or another fixed value). In this example, the computing device 100, in response to the battery alarm occurring during a suspend-to-RAM state, in like fashion as discussed above, may transition from a suspend-to-RAM to an active state and then may transition to a lower power state, such as a suspend-to-disk state or a power-off state. Of course, other fixed values may be used.

In other embodiments, alarms (e.g., RTC, battery alarms and/or other alarms or events) for triggering power management activities may be scheduled based on usage statistics 160 for the computing device 100. In such approaches, the computing device 100 may be configured to gather usage statistics 160 for the computing device 100, such as a frequency of user interaction with the computing device 100, an average power use over time, an amount of battery charge and/or battery, along with other usage/operating information for the computing device 100. In such approaches, the computing device 100 may be configured to automatically schedule alarms to trigger performance of power management activities based on the usage statistics 160. For example, the usage statistics 160 may include information that indicates that, on average, if the computing device 100 remains inactive (e.g., does not receive any user input) for a first period of time (e.g., ninety minutes), then the computing device 100 is likely to remain inactive for at least a second period of time (e.g., twelve hours). In this situation, the computing device 100 may be configured to automatically schedule an RTC alarm to occur shortly after the expiration of the first period of time (e.g., after the device has been inactive for one-hundred minutes or ten minutes after the expiration of the first period of time). If the computing device 100 is in a suspend-to-RAM state when the RTC alarm occurs, the RTC alarm can cause the device to transition from the suspend-to-RAM to an active state and then transition to a lower power state, such as hibernate or powered off in order to save power during long inactivity periods.

Similar approaches may be implemented using other usage statistics 160. For example, battery alarms can be automatically scheduled based on average power consumption or a battery charge level threshold. In other arrangements, the computing device 100 may be configured to automatically schedule RTC alarms based on a system time of the computing device 100. In such an approach, the computing device 100 may be configured to set RTC alarms using longer time periods during normal business hours (which may be defined using default values or user input) and set RTC alarms using shorter time periods during non-business hours. Such an arrangement may improve a user's experience with the computing device 100, as the user is less likely to have to wait for the computing device 100 to resume from a hibernate or power off state (which takes longer than resuming from a suspend-to-disk state) during normal business hours, when use of the computing device 100 by the user is likely to be more frequent.

The foregoing examples are given by way of illustration and a number of other usage statistics may be used when automatically scheduling alarms in the computing device 100 to trigger performance of power management activities or when determining when to perform certain power management activities, such as performing a screen dimming operation, for example. Such usage statistics may include individual user based statistics, group or community based statistics and/or statistics based on activity of the computing device.

As an example of individual user based statistics, the computing device 100 may monitor interaction of a user with the computing device 100. Based on that monitoring, the computing device 100 may determine that if the user does not interact with the computing device 100 for twenty minutes or more, the user tends to be gone for an hour. In this situation, the computing device 100 may wait twenty minutes before transitioning to a first low power state (e.g., a suspend to RAM state) and set an alarm for forty minutes after the transition to the first low power state, where occurrence of the alarm causes the computing device 100 to perform further power management activities, including transitioning the computing device 100 to an even lower low power state (e.g., a suspend to disk state or a powered off state).

For group or community based statistics, usage information may be gathered for a population of users. For instance, usage information could be gathered for tens, hundred, thousands or more users. After gathering the usage information, statistical analysis may be performed on that information to determine commonalities among the population of users and/or general tendencies of the population of users (e.g., group based statistics). Those group based statistics may then be used for scheduling power management activities, such as alarms or other events, such as those discussed herein. For instance, based on a statistical analysis of usage information for a population of users, it may be determined that most users (e.g., 90 percent or more) will interact with their computer using the mouse to undim their screen if the last interaction with the computing device was less than ten minutes ago. Based on this information, a screen dim time for individual computing devices may be set at a default value of eleven minutes, which may both improve the user's experience as well as reduce overall power consumption by reducing the number of repeated dimming and undimming cycles of the display.

As another example of group or community based statistics, commonalities or tendencies may be identified that are associated with a specific geography. For instance, a statistical analysis of usage information for a population of users in the United States and Europe may show that users in the United States tend to actively use their computing devices from 8:30 a.m. to 6:00 pm and from 9:30 p.m. to 11:00 p.m., while users in Europe tend to use their computing devices from 6:00 a.m. to 2:00 p.m. and from 4:00 p.m. to 7:00 p.m. Power management activities and alarms, such as those described herein, may then be scheduled for an individual computing device based on this tendency information and a geography in which the individual computing device is used.

In other embodiments, a computing device may schedule activities related to power management based on activities of the given computing device. For example, if a wireless access point list for a computing device is checked periodically and that checking results in multiple power spikes in the wireless component, the manner and timing for performing the access point list check may be modified in order to reduce and/or eliminate the occurrence of such power spikes.

Furthermore, other types of alarms may also be used to trigger the computing device 100 to perform power management activities when the computing device 100 is in a non-aware state. For example, a remote management alarm can be received over a network interface to cause the device to perform various power management activities, which can be done when the computing device 100 is in a non-OS aware state by keeping at least a portion of the network interface active when the computing device 100 is suspended.

Figure 2:
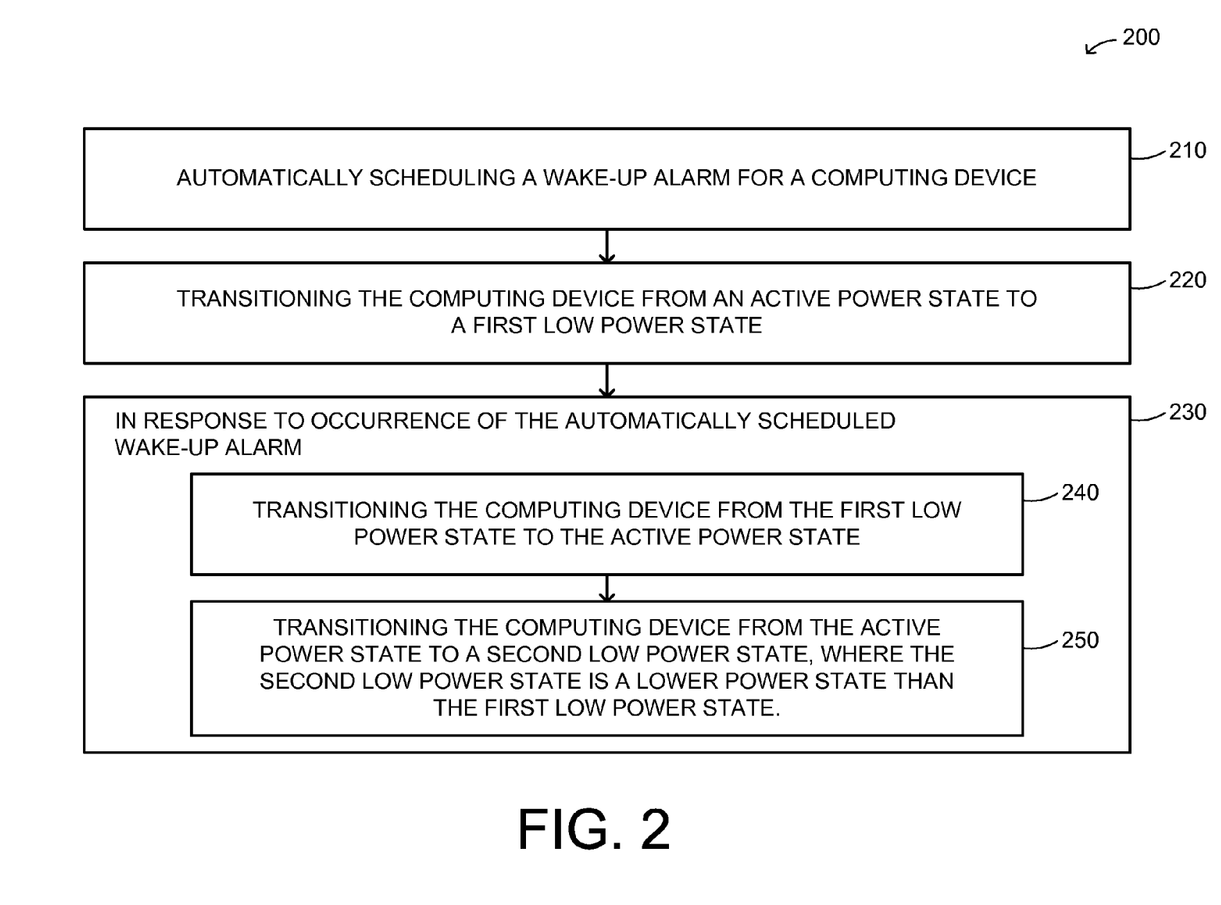
FIG. 2 is a flowchart illustrating a method in accordance with an example embodiment.
Figure 3:
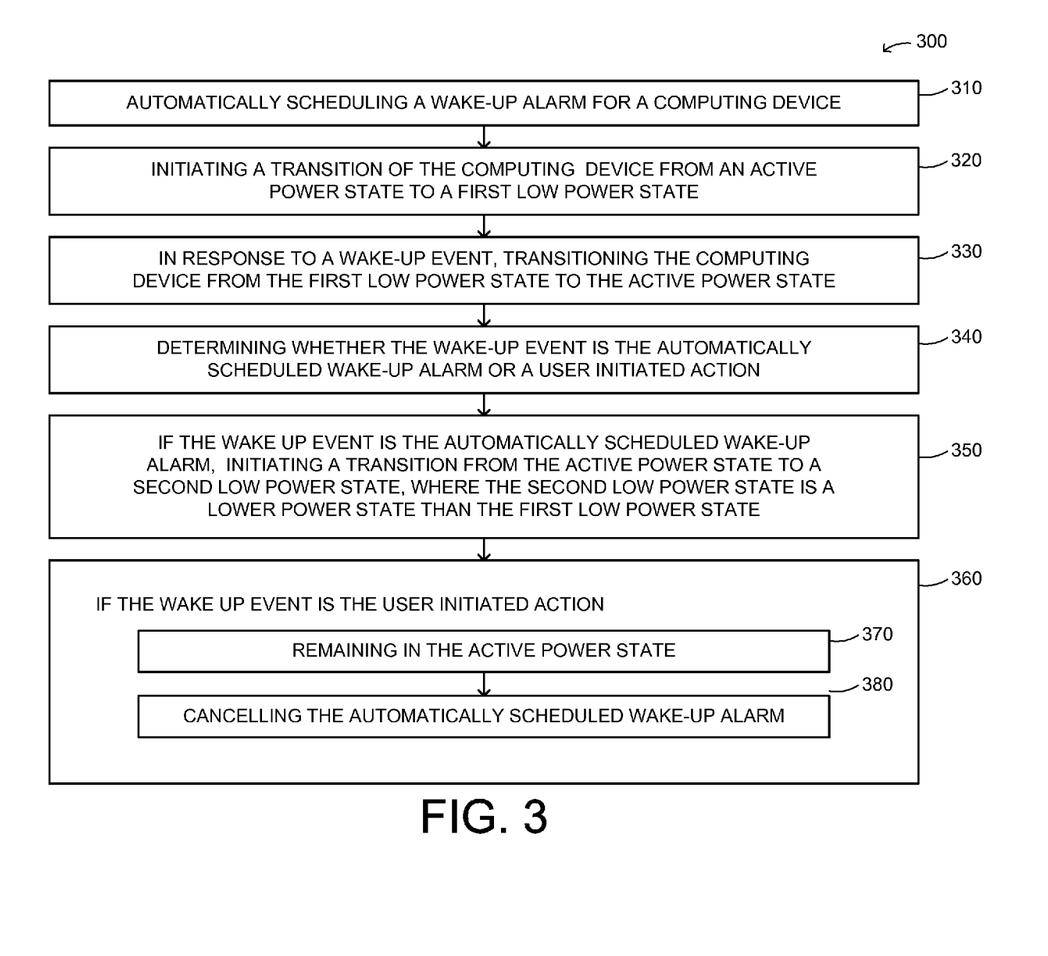
FIG. 3 is a flowchart illustrating another method in accordance with an example embodiment.
Figure 4:
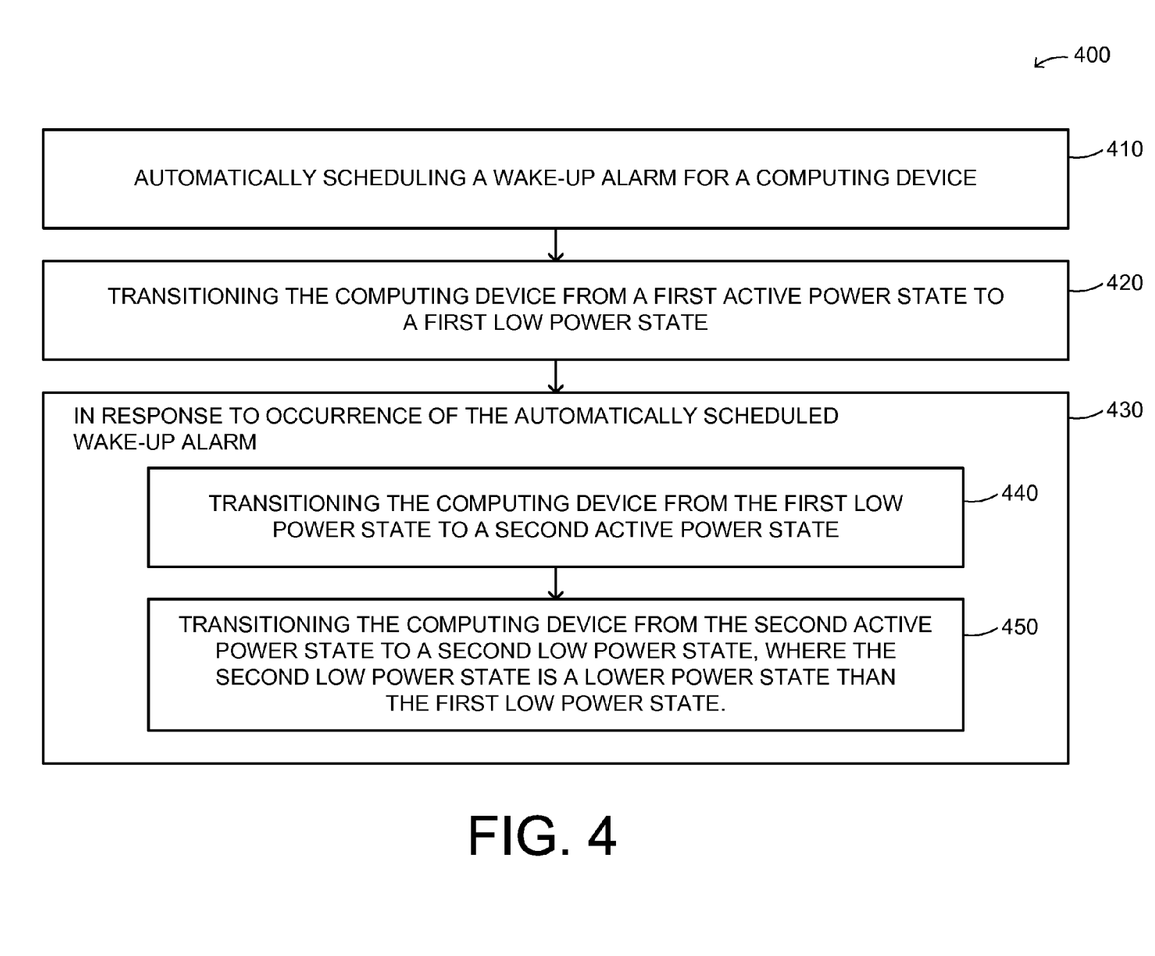
FIG. 4 is a flowchart illustrating yet another method in accordance with an example embodiment.

FIGS. 2-4 are flowcharts illustrating methods for implementing power state transitions in a computing device. The techniques illustrated in FIGS. 2-4 may be implemented in the computing device 100 of FIG. 1. Accordingly, the methods illustrated in FIGS. 2-4 will be described with further reference to FIG. 1. It will be appreciated, however, that the methods shown in FIGS. 2-4 may be implemented in other computing device configurations and are not limited to the specific arrangement of the computing device 100, as illustrated in FIG. 1.

FIG. 2 is a flowchart illustrating a method 200 in accordance with an example embodiment. The method 200 includes, at block 210, automatically scheduling a wake-up alarm for the computing device 100, such as using the techniques described above. For example, automatically scheduling a wake-up alarm at block 210 may include scheduling a real-time-clock (RTC) alarm (based on a fixed time period or based on the usage statistics 160). In other embodiments, automatically scheduling the wake-up alarm at block 210 may include automatically scheduling a battery alarm, which may be scheduled based on a fixed battery capacity threshold and/or based on the usage statistics 160. In still other embodiments, other types of wake up alarms may be automatically scheduled, which may be based on fixed values and/or, alternatively, on the usage statistics 160.

At block 220, the method 200 includes transitioning the computing device 100 from an active power state to a first low power state. For example, block 210 may include transitioning the computing device 100 from a battery or AC power active state to a suspend-to-RAM state. As part of the transition to the suspend-to-RAM state, the computing device 100 may save operating state information for the computing device 100 to RAM 110. After the operating state information is saved to RAM 110, the power manager 130 (e.g., in conjunction with the processor 105) may be configured to place the computing device 100 in a state where a limited number of the components of the computing device 100 remain active, including RAM 110 that is used to preserve the operating state information. Once in the suspend-to-RAM state, the computing system 100 would be in a non-OS aware state, as the computing device 100 is no longer in an active (operating) state with the operating system running. In other embodiments, other elements of the computing system 100 may implement the transition at block 220.

The method 200, at block 230, includes operations for implementing a power management activity in response to occurrence of the automatically scheduled alarm of block 210. At block 240, the method 200 includes, in response to occurrence of the automatically scheduled wake-up alarm, transitioning the computing device 100 from the first low power state (e.g., a suspend-to-RAM state) to the active power state. At block 250, the method 200 includes, also in response to occurrence of the automatically scheduled wake-up alarm of block 210, transitioning the computing device 100 from the active power state to a second low power state, where the second low power state is a lower power state than the first low power state, such as a suspend-to-disk (hibernate) state or a power off state.

In the method 200, the transition at block 250 may include saving the operating state information (or a subset of the operating state information) saved at block 220 to the disk 115 (or other persistent storage). In certain embodiments, saving a subset of the operating state information may be performed in order to facilitate graceful shutdown of the computing device 100 in order to prevent startup/boot issues when the computing device is restarted from a hibernate or power-off state, for example. For instance, in an example embodiment, such an approach may include saving and/or closing any open files, saving queued data to disk and/or saving state data for in-progress operations to a network server. Such an approach may be used, for example, in response to a battery alarm when a charge (capacity) of the battery 150 reaches a relatively low (e.g., five percent or less) capacity threshold, such as discussed above.

In the method 200, the active power state at blocks 220, 230 and 240 may be an AC power operating state or a battery power operating state. Also in the method 200, the first low power state at blocks 220 and 240 may be a suspend-to-RAM state or a suspend-to-disk state and the second low power state at block 250 may be a suspend-to-disk state or a power-off state, as discussed above. Further in the method 200, transitioning from the first low power state to the active power state at block 230 may include implementing a resume-from-suspend process to restore operating state information (e.g., operating system parameters) that was stored to RAM 110 or disk 115 at block 220.

In an alternative embodiment, the transition from the active power state to the first low power state at block 220 of the method 200 may include saving operating-state information for the computing device 100 to both the RAM 110 and the disk 115, either in parallel or in sequence. In such an approach, since the operating-state information for the computing device 100 is saved to both the RAM 110 and the disk 115 at block 220, the operation at block 240 could be eliminated. In this example, the computing device 100 may, at block 250, transition to the second low power state directly from the first low power state. In such an approach, the transition to the second low power state at block 250 may be performed by a secondary processor, such as an embedded controller, in response to occurrence, at block 230, of the alarm scheduled at block 210.

FIG. 3 is a flowchart illustrating another method 300 in accordance with an example embodiment. In similar fashion as the method 200, the method 300, at block 310, may include automatically scheduling a wake-up alarm for a computing device. The wake-up alarm may be scheduled using the techniques described above. In an alternative approach, the wake-up alarm may be scheduled based on a battery reading for the battery 150 of the computing device 100, where the battery reading is included in the usage statistics 160.

In another approach, the power manager 130 may be configured to obtain a battery reading indicating a current charge level of the battery 150 just prior to entering a suspend state, and the wake-up alarm at block 310 may be scheduled based on that battery reading. For instance, a battery alarm may be automatically scheduled to occur when the charge of the battery 150 drops to a fixed percentage below the capacity indicated by the battery reading obtained by the power manager 130. For example, the computing device 100 may be configured to automatically schedule a battery alarm to occur when the battery drops to a charge level that is twenty-five percent of its fully charged capacity below the capacity indicated by the battery reading. In such an arrangement, if the battery reading indicates that the battery is at seventy-five percent of its fully charged capacity, the computing device 100 may automatically schedule a battery alarm that will occur when the capacity of the battery 150 reaches fifty-percent of its fully charged capacity.

In other embodiments, the wake-up alarm at block 310 may be automatically scheduled based on a frequency of user interaction with the computing device 100, such as in the fashion discussed above. In such an approach, the frequency of user interaction with the computing device may be included in the usage statistics 160. Of course, other appropriate techniques for scheduling a wake-up alarm may be used at block 310.

At block 320, the method 300 includes initiating a transition of the computing device 100 (e.g., transitioning the computing device 100) from an active power state to a first low power state. At block 330, in response to a wake up event (which may be the wake-up alarm or another event), the method 300 includes transitioning the computing device 100 from the first low power state to the active power state (e.g., performing a resume-from-suspend). At block 340, the method 300 includes determining whether the wake up event is the automatically scheduled wake-up alarm or a user-initiated action.

In the method 300, a user-initiated wake up event may be an event that indicates user interaction with the computing device 100. For example, a user-initiated wake-up event may occur as a result of a signal indicating activity of a user-input device of the computing device 100, such as a signal indicating input to the computing system 100 from the keyboard 135 or the pointing device 140. A user-initiated wake-up event may also occur as a result of a signal indicating engagement of the power switch 125 of the computing device 100. In other instances, the user-initiated action or wake-up event may occur as a result of a signal that indicates the display 120 of the computing device 100 (e.g., on a laptop or netbook computer) was moved from a closed position to an open position. In such an approach, a switch may be used to detect a user opening the display 120.

At block 350, if it is determined at block 340 that the wake up event is the automatically scheduled wake-up alarm, the method 300 may include initiating a transition of the computing device 100 (e.g., transitioning the computing device 100) from the active power state to a second low power state, where the second low power state is a lower power state than the first low power state. In like fashion as the method 200, the active power state at blocks 320, 330 and 350 may be an AC power operating state or a battery power operating state. Also in the method 300, the first low power state at blocks 320 and 330 may be a suspend-to-RAM state or a suspend-to-disk state and the second low power state at block 350 may be a suspend-to-disk state or a power-off state.

The method 300, at block 360, includes operations that may be performed in the event it is determined, at block 340, that the wake-up event of block 330 is the result of a user-initiated action, such as those described above, for example. At block 370, the method 300 includes the computing device 100 remaining in the active power state and, at block 380, cancelling the automatically scheduled wake-up alarm of block 310. Such an arrangement prevents the computing device 100 from transitioning from the active state to the second low power state (such as at block 350) when a user is interacting with the computing device 100.

FIG. 4 is a flowchart illustrating yet another method 400 in accordance with an example embodiment. The method 400 includes, at blocks 410, 420, 430, 440 and 450, similar operations as those illustrated, respectively, in blocks 210, 220, 230, 240 and 250 of the method 200 of FIG. 2. Accordingly, for purposes of brevity, the details of those operations are not repeated again here in their entirety and the discussion of FIG. 4 is directed to differences between the methods 200 and 400.

As compared with the method 200, the method 400 includes, at block 420, transitioning the computing device 100 from a first active state to a first low power state and, at block 440, transitioning the computing device 100 from the first low power state to a second active power state. Accordingly, as shown in the method 400, the active power states at blocks 420 and 440 may be different active power states. For example, the first active power state, at block 420, may be an AC power state and the second active power state, at block 440, may be a battery power state. Such an approach may be implemented in situations where the computing device 100 is initially operating on AC power (e.g., at blocks 410 and 420) and then is disconnected from AC power and is operating on battery power (e.g., at blocks 430-450).

In such an approach, the computing device, at block 410, may automatically schedule a battery alarm, such as in the fashions described herein, while the computing device is operating on AC power, where the battery alarm is scheduled to occur when a capacity of the battery 150 drops to a threshold capacity. If the computing device 100 is disconnected from AC power after block 420 of the method 400, the battery alarm that was automatically scheduled at block 410 would occur when the battery threshold is met. This would trigger the operations of blocks 430-450, resulting in the computing device 100 being transitioned from the first low power state (e.g., a suspend-to-RAM state) to the battery power (second) operating state at block 440 and then transitioned to the second low power state (e.g., a suspend-to-disk or power-off state) at block 450, including persistently storing operating state information for the computing device 100, such as in the fashions discussed herein.

Figure 5:
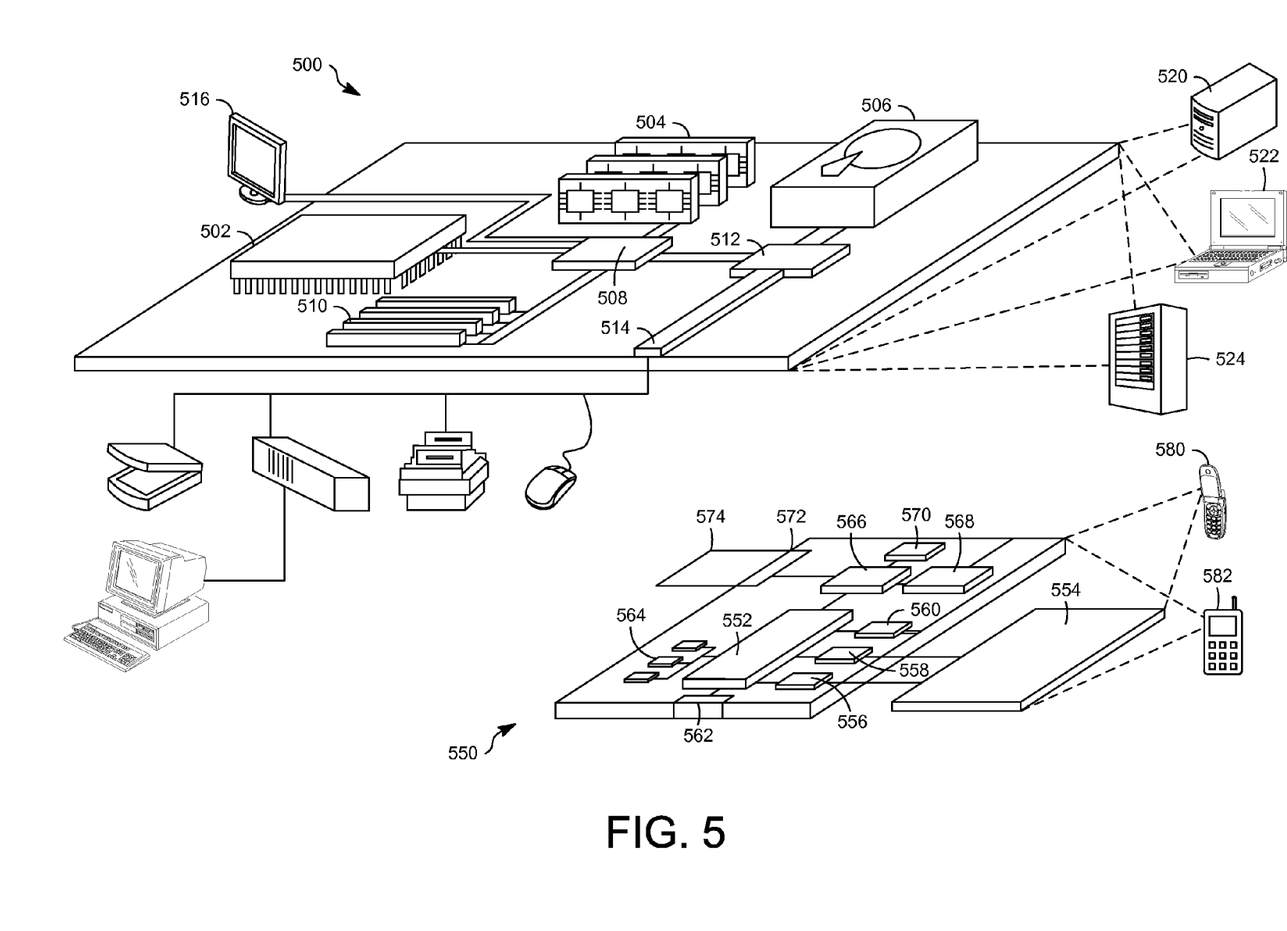
FIG. 5 is a diagram illustrating a computing device and a mobile computing device that can be used to implement the techniques described herein in accordance with an example embodiment.

FIG. 5 is a diagram that shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/ or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, which may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory recordable storage medium having recorded and stored thereon instructions that, when executed by a computing device, cause the computing device to:
    obtain a reading indicating a charge level of a battery while the computing device is operating in an active power state;
    determine a threshold battery charge capacity based on the reading;
    automatically schedule a wake-up alarm for the computing device, the wake-up alarm occurring when a battery charge capacity falls below the threshold battery charge capacity;
    transition the computing device from the active power state to a first low power state; and
    in response to occurrence of the wake-up alarm:
        transition the computing device from the first low power state to a second low power state, wherein the second low power state is a lower power state than the first low power state, and wherein the transitioning occurs without transitioning the computing device to the active power state before transitioning the computing device to the second low power state.

2. The non-transitory recordable storage medium of claim 1, wherein the active power state is a battery power operating state.

3. The non-transitory recordable storage medium of claim 1, wherein the first low power state is a suspend-to-random-access-memory (RAM) state and the second low power state is one of a suspend-to-disk state and a power-off state, and wherein transitioning the computing device from the active power state to the first low power state includes saving operating-state information for the computing device to random-access-memory (RAM) and to non-volatile memory.

4. The non-transitory recordable storage medium of claim 1, wherein the first low power state is a suspend-to-disk state and the second low power state is a power-off state, and wherein transitioning the computing device from the active power state to the first low power state includes saving operating-state information for the computing device to random-access-memory (RAM) and to non-volatile memory.

5. The non-transitory recordable storage medium of claim 1, wherein transitioning from the active power state to the first low power state comprises saving, to random-access-memory (RAM) and to non-volatile memory, operating state information of the computing device.

6. The non-transitory recordable storage medium of claim 1, wherein the threshold battery charge capacity is a fixed percentage below the charge level of the battery.

7. A computer-implemented method comprising:
    obtaining, by a computing device, a reading indicating a charge level of a battery while the computing device is operating in an active power state;
    determining, by the computing device, a threshold battery charge capacity based on the reading;
    automatically scheduling a wake-up alarm for the computing device, the wake-up alarm occurring when a battery charge capacity falls below the threshold battery charge capacity;
    transitioning the computing device from the active power state to a first low power state; and
    in response to occurrence of the wake-up alarm:
        transitioning the computing device from the first low power state to a second low power state, wherein the second low power state is a lower power state than the first low power state, and wherein the transitioning occurs without transitioning the computing device to the active power state before transitioning the computing device to the second low power state.

8. The computer-implemented method of claim 7, wherein the active power state is a battery power operating state.

9. The computer-implemented method of claim 7, wherein the first low power state is a suspend-to-random-access-memory (RAM) state and the second low power state is one of a suspend-to-disk state and a power-off state, and wherein transitioning the computing device from the active power state to the first low power state includes saving operating-state information for the computing device to random-access-memory (RAM) and to non-volatile memory.

10. The computer-implemented method of claim 7, wherein the first low power state is a suspend-to-disk state and the second low power state is a power-off state, and wherein transitioning the computing device from the active power state to the first low power state includes saving operating-state information for the computing device to random-access-memory (RAM) and to non-volatile memory.

11. The computer-implemented method of claim 7, wherein transitioning from the active power state to the first low power state comprises saving, to random-access-memory (RAM) and to non-volatile memory, operating state information of the computing device.

12. The computer-implemented method of claim 7, wherein the threshold battery charge capacity is a fixed percentage below the charge level of the battery.

* * * * *

UNITED STATES PATENT AND TRADEMARK OFFICE
CERTIFICATE OF CORRECTION

| | |
|---|---|
| PATENT NO. | : 9,239,605 B1 |
| APPLICATION NO. | : 13/079526 |
| DATED | : January 19, 2016 |
| INVENTOR(S) | : Sameer Nanda |

Page 1 of 1

It is certified that error appears in the above-identified patent and that said Letters Patent is hereby corrected as shown below:

On the title page item (74), in column 2, in "Attorney, Agent or Firm", line 1, delete "Huges" and insert -- Hughes --, therefor.

Signed and Sealed this
Nineteenth Day of April, 2016

Michelle K. Lee
*Director of the United States Patent and Trademark Office*